United States Patent [19]

Brandao et al.

[11] Patent Number: 5,563,604
[45] Date of Patent: Oct. 8, 1996

[54] WEATHER RADAR USING SPECTRAL GAUSSIAN ENVELOPE DISCRIMINATION FOR CLUTTER REJECTION

[75] Inventors: Ruy L. Brandao, Ft. Lauderdale; Arezki Manseur, Boca Raton; Randall C. Spires, Boca Raton; William C. Weist, Boca Raton; Philip R. Hermann, Coral Springs, all of Fla.

[73] Assignee: AlliedSignal Inc., Morris Township, N.J.

[21] Appl. No.: 385,494

[22] Filed: Feb. 8, 1995

[51] Int. Cl.$^6$ .............................. G01S 7/292; G01S 13/95
[52] U.S. Cl. .............................. 342/159; 342/26; 342/192
[58] Field of Search .............................. 342/26, 159, 192, 342/194, 460

[56] References Cited

U.S. PATENT DOCUMENTS 3,783,258   1/1974   Chwastyk .............................. 342/26

*Primary Examiner*—Ian J. Lobo
*Attorney, Agent, or Firm*—John R. Rafter

[57] ABSTRACT

A method for removing clutter related frequency components from power spectrums generated from weather radar return signals to provide improved windshear detection capability. Weather radar return signals are synchronously detected and digitized to provide i and q time domain sample sequences. The i and q time domain sample sequences are passed through a window function and then transformed to frequency domain sequences by a Fast Fourier Transform. A power spectrum is generated from the frequency domain sequences. The spectrum is subjected to a Spectral Gaussian Envelope Discrimination (SGED) process in which the spectral envelope is scanned to identify any lobe therein having a slope greater than a predetermined minimum. A first pseudo-Gaussian sigma, calculated from the width and maximum amplitude of any such lobe, is compared with a second pseudo-Gaussian sigma, calculated from known conditions. If the first sigma is less than the second sigma, the lobe is deemed to be clutter related and is edited from the spectral envelope.

15 Claims, 7 Drawing Sheets

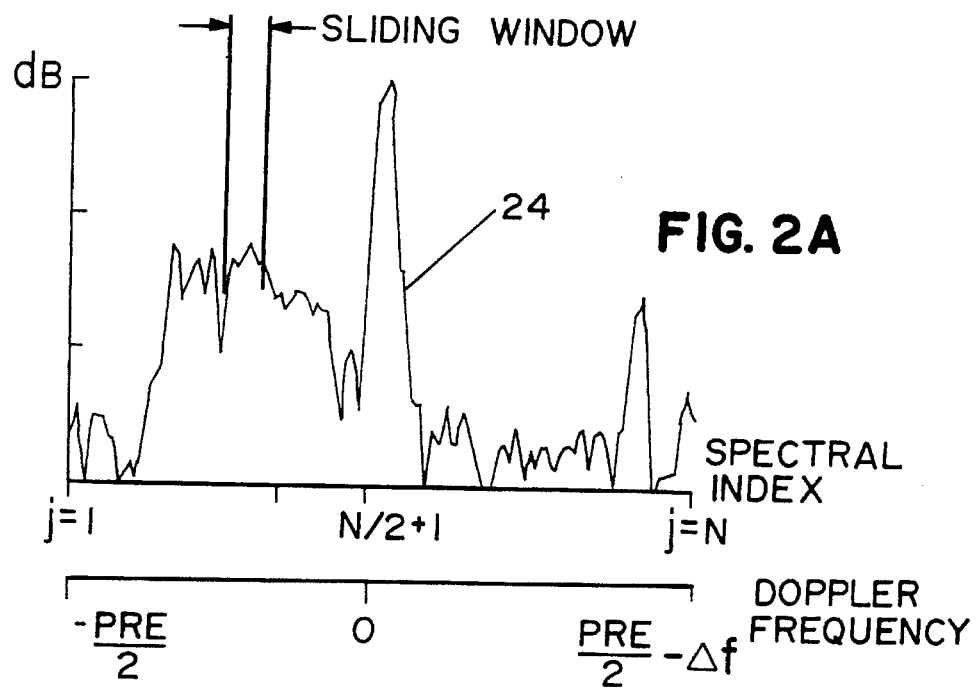
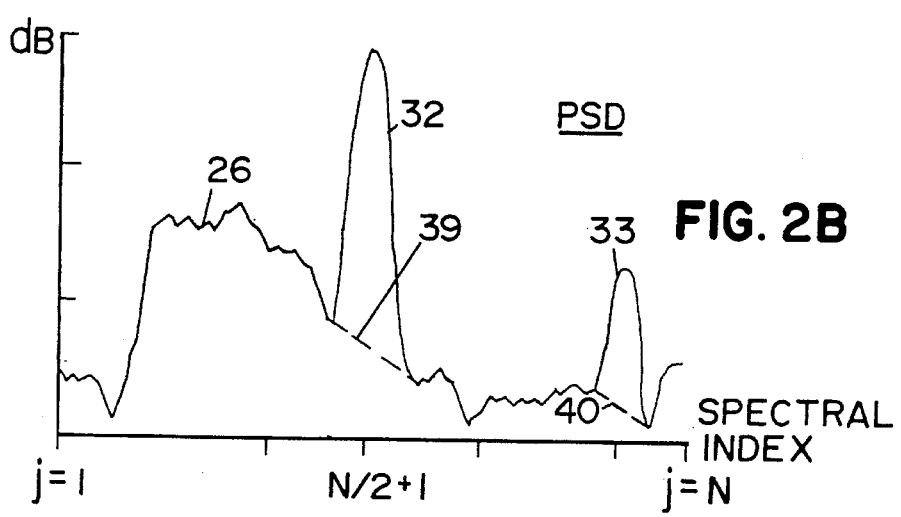
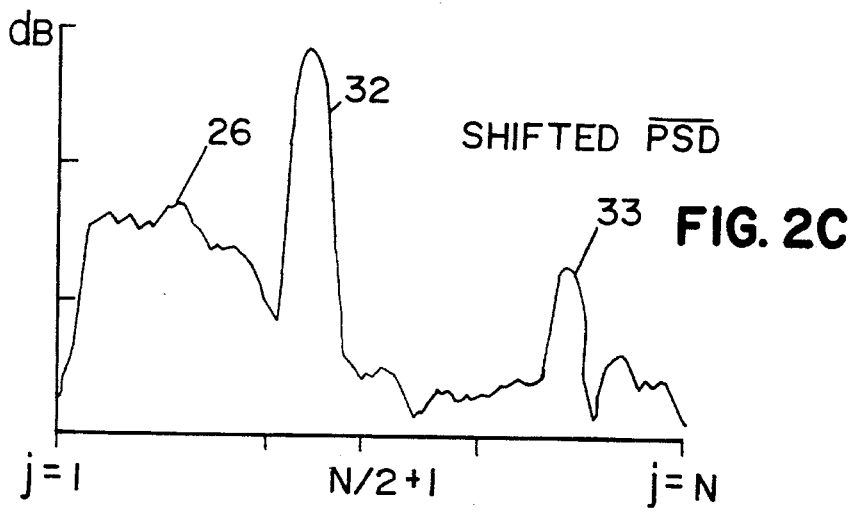

WEATHER RADAR USING SPECTRAL GAUSSIAN ENVELOPE DISCRIMINATION FOR CLUTTER REJECTION

FIELD OF THE INVENTION

The present invention relates generally to weather radar. More particularly, it relates to a clutter rejection process that discriminates and conditionally edits clutter-related spectral content from Doppler frequency evaluations of weather radar return signals. The method of the invention relies upon the quasi-Gaussian distribution of the clutter related components of the Doppler spectrum to characterize unwanted spectral content. The process of the invention is especially suited for use in airborne weather radars adapted for the detection of windshear phenomena.

BACKGROUND OF THE INVENTION

During takeoff and landing an aircraft can encounter hazardous flight conditions caused by windshear. Thunderstorms and rain showers often give rise to microbursts, which are intense localized downdrafts that spread along the ground, producing the phenomena known as windshear. Windshear is a defined change in wind direction and velocity within the air mass along an aircraft trajectory. When an aircraft enters windshear it encounters headwinds of growing strength that increase lift, enticing the pilot to reduce engine power and alter the aircraft attitude to maintain a desired flight path. As the aircraft transitions to the windshear center, the wind shifts to a severe downdraft that results in a strong downward force. This force can rapidly overcome available lift and lead to substantial loss in altitude. As the rapidly falling aircraft progresses to the back of the windshear, the wind direction shifts again, becoming an intense tailwind that further robs the aircraft of lift and increases rate of descent. The overall loss of altitude, coupled with the power reduction initiated when first entering windshear, can plunge an aircraft downward hundreds of feet in seconds, overwhelming the reaction time required to restore full engine power and establish a positive rate of climb.

Since windshears often occur within the first 300 meters of ground, the radar illuminates significant ground clutter when searching for the phenomenon. Microbursts can also contain relatively small amounts of moisture, resulting in low radar reflectivities and hence very low signal-to-clutter power ratios for associated windshear activity. Consequently, in order to estimate wind characteristics, clutter-related contributions to the radar returns must be filtered out, making the filtering process a key determinate of windshear detection performance.

The definition of clutter is application dependent. In general, any signal contributions not related to the signals of interest are classified as clutter. In the case of windshear detection, the signals of interest are the radar returns resulting from meteorological phenomena. All other signals, such as those obtained from stationary and moving objects located on the ground, are classified as clutter related. Noise, independent of both clutter related signals and signals of interest, is determined by such system limitations as effective antenna temperature and receiver noise figure.

Prior weather radars adapted for windshear detection process the radar returns to establish the Doppler spectrum thereof and then filter the Doppler frequency spectrum using a conventional stop-band filter. The filter is centered on a Doppler frequency that is related to the aircraft velocity and the antenna aspect angle. The filter center frequency must be precisely selected to prevent loss of desired signal. Even when an optimum value is chosen for the filter center frequency, spectral content of interest may be eliminated. Further drawbacks of the prior method are that the filter does not remove clutter resulting from stationary objects illuminated by antenna side lobes nor does it eliminate clutter resulting from moving discrete targets.

SUMMARY OF THE INVENTION

Briefly, the method of the invention comprises, in conjunction with a scanning beam weather radar, synchronously detecting the radar return signals to provide I (in phase) and Q (quadrature) components that are digitized and stored as N orthogonal pairs in an M×N memory array. Each set of N elements (I/Q pairs) is then windowed using a time domain taper designed to minimize Doppler frequency side lobes (upon time-to-frequency domain transformation) and to optimize small signal detection. After windowing, a complex Fast Fourier Transform (FFT) is performed to convert the N element pairs from the time domain to the Doppler frequency domain. By completing power detection on the resulting frequency domain I and Q values, an N point power spectral density (PSD) spectrum is generated detailing the frequency content of the sample sequences.

The entire PSD spectrum is passed through a smoothing sliding window filter to reduce amplitude fluctuations. The smoothed spectrum is then pivot-shifted (with circular indexing at the boundaries) so that the index of the frequency component having the lowest amplitude is considered the first element of the PSD sequence. Shifting the indices of the PSD in such way permits spectral Gaussian envelope discrimination (SGED) to be performed with optimum efficiency.

The PSD spectral envelope is scanned from the lower frequency indices toward the higher frequency indices to identify any lobes thereof having a slope greater than a predetermined minimum. The width and maximum amplitude of any such lobe is determined and the lobe is subjected to a curve fitting operation to establish whether the lobe possesses the pseudo-Gaussian statistical parameters that characterize it as clutter related spectra. The PSD spectrum is filtered by editing out spectral lobes characterized as clutter, leaving in the spectrum only the content resulting from low-level system noise and returns from weather and windshear. The filtered spectrum is un-shifted to return the frequency indices to the original distribution. It is then subjected to further processing to extract total hazard factor estimates associated with windshear phenomena prior to issuing air crew windshear alerts.

It is an object of the invention to provide a method of processing radar return signal data to eliminate undesired clutter therefrom.

It is another object of the invention to provide an improved method of processing weather radar return signal data for detecting hazardous windshear conditions in time to permit the crew of an aircraft to take protective measures.

It is another object of the invention to provide a method for eliminating from the Doppler spectrum of weather radar return signals frequency content due to clutter.

It is still another object of the invention to provide a method for eliminating from a power spectrum frequency content having a pseudo-Gaussian distribution that is characteristic of clutter or moving discrete targets.

5,563,604

DESCRIPTION OF THE DRAWINGS

FIG. 2A shows the envelope of a typical power spectrum prior to filtering with a sliding window type filter.

FIG. 2B shows the spectrum of FIG. 2A after filtering.

FIG. 2C shows the spectrum of FIG. 2B with the frequency indices shifted.

DETAILED DESCRIPTION OF THE INVENTION

Figure 1:
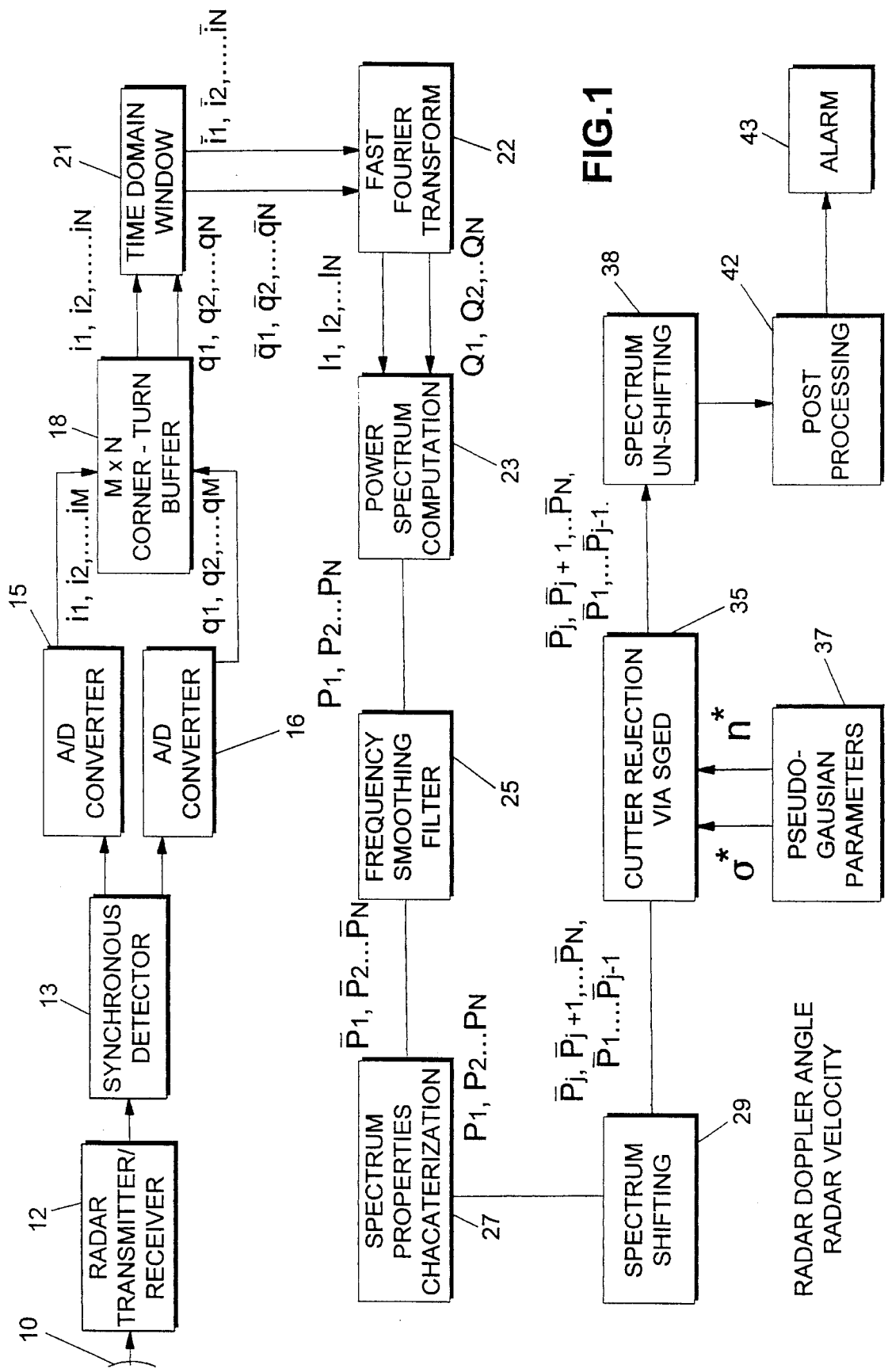
FIG. 1 is a functional block diagram of a weather radar incorporating the inventive Spectral Gaussian Envelope Discrimination process of clutter elimination.

FIG. 1 illustrates the invention in block diagram form. A scanning antenna 10 operating with a radar transmitter-receiver 12 provides radar return signals that are detected in a synchronous detector 13 to provide baseband I (in phase) and Q (quadrature) complex return signals. The I and Q analog outputs of detector 13 are respectively digitized in A/D converters 15 and 16 and are separately stored in an M×N corner-turn buffer 18.

The digitized I and Q return signals from each transmitted pulse are stored in buffer 18 according to their time of reception in one of a total M columnar locations corresponding to M successive range bins. The returns from each of a total of N successive pulses are stored in buffer 18 in locations corresponding to successive rows. The row locations of buffer 18, are sometimes referred to herein as "Doppler frequency bins". "Doppler frequency bin" or "bin number" may also be used to refer to the index of a sample in a sequence.

For windshear detection purposes, a maximum range for detection of windshear of 12040 meters (6.5 nautical miles) with a range resolution 150 meters is adequate. For optimum detection, the angle swept by the antenna during collection of a return signal sample set should equal approximately 70% of the beamwidth. The number N of successive pulses making up a sample set can be determined as $N \sim (0.7 \cdot \theta_3 \cdot PRF)/\omega_s$. A radar pulse repetition frequency (PRF) of 3000 p.p.s., an antenna beam width of 3° and scan rate $\omega_s$ of 45°/s. are typical. Such criteria establish that the radar return signal be sampled at 1 µs. intervals for 80 µs., i.e., M=80, and N~140. For efficiency of FFT processing, N is selected to be 128.

The sample sequences $i_1, i_2, \ldots i_N$ and $q_1, q_2, \ldots q_N$ stored in one range bin of buffer 18 are passed through a time domain window 21 to generate sequences $\bar{i}_1, \bar{i}_2, \ldots \bar{i}_N$ and $\bar{q}_1, \bar{q}_2, \ldots \bar{q}_N$ for application to a Fast Fourier Transform (FFT) 22. Window 21 comprises a table of weighting coefficients by which each of the samples of the i and q sequences from buffer 18 are multiplied, according to the order of the samples in a sequence. The weighting coefficients are designed to reduce the amplitudes of the i and q samples near the ends of the sequences to improve the resolution and detectability of weak signals, once the samples are transformed into the frequency domain by the FFT. Window 21 is preferably a Dolph-Chebyshev window with α=3.5, known in the art per se. Other suitable windows, as well as the complete algorithm for the Dolph-Chebyshev window, are described in the article "On the Use of Windows for Harmonic Analysis with the Discrete Fourier Transform" by F. J. Harris, Proc. IEEE, v. 66, pp. 51–83, January 1978.

The i and q samples from the window 21 are transformed from the time domain to the frequency domain using a fast Fourier transform (FFT) 22. The FFT may comprise any of the well known methods for efficiently computing the coefficients of a discrete Fourier transform (DFT) of the form below:

$$A_r = \sum_{k=0}^{N-1} (X_k) W^{rk} \quad (1)$$

$$W = \epsilon^{\frac{-2\pi j}{N}}$$

The power spectrum of the complex I and Q sequences generated by FFT 22 is computed at step 23 by summing the squares of the components of the respective sequences, i.e., $$P_j = I_j^2 + Q_j^2;$$

$$j = 1, 2, \ldots N$$

FIG. 2A shows the envelope of a typical power spectrum produced by step 23. The spectrum actually consists of a sequence $P_1, P_2, \ldots P_N$ of discrete power levels. For purposes of illustration, the spectrum is shown as a continuous line 24 that joins the end points of the power magnitudes at the frequency indices $1, 2, \ldots N$. The abscissa in FIG. 2A is scaled for spectral index extending from j=1 to j=N, with the center point at (N/2+1). The corresponding Doppler frequency scale extends from −PRF/2 Hz, at j=1, to (+PRF/2−Δf) Hz, at j=N, where Δf=PRF/N. The center point of the spectral index scale corresponds to 0 Hz of the Doppler frequency scale.

The spectrum is passed through a frequency smoothing filter 25 formed by averaging the contents of a sliding window having a width of a fixed integral number X of frequency bins (indices). Preferably, X=5. Filter 25 is described by the algorithm:

$$\overline{PSD}:\bar{P}_j = \frac{1}{X} \times \sum_{j=i-\frac{X-1}{2}}^{i+\frac{X-1}{2}} P_j \quad (2)$$

The circular symmetry of the FFT produced PSD spectrum permits circular indexing to be used when averaging the powers at frequency indices within (X−1)/2 of the spectrum frequency boundaries. That is, at the lower frequency boundary of the spectrum where j=0 and j=−1, indices N and N−1 are used, respectively. At the upper frequency boundary where j=N+1 and j=N+2, indices 1 and 2 are used, respectively.

FIG. 2B shows the envelope 26 of the PSD after smoothing of the spectrum in filter 25. The sequence $\bar{P}_1, \bar{P}_2, \ldots \bar{P}_N$ is next subjected to a spectrum properties characterization operation 27 that involves searching the spectrum for the frequency index of the minimum power component and computing the estimated average noise power per frequency bin (index).

The estimated noise power per frequency bin is computed from the following:

$$\text{Noise Est.} = \beta \times \sqrt{\frac{1}{\frac{1}{N} \times \sum_{j=1}^{N}\left(\frac{1}{\overline{P}_j}\right)^2}} \quad (3)$$

$\beta = 1.5\text{--}2.0\text{(typically)}$

Figure 3:
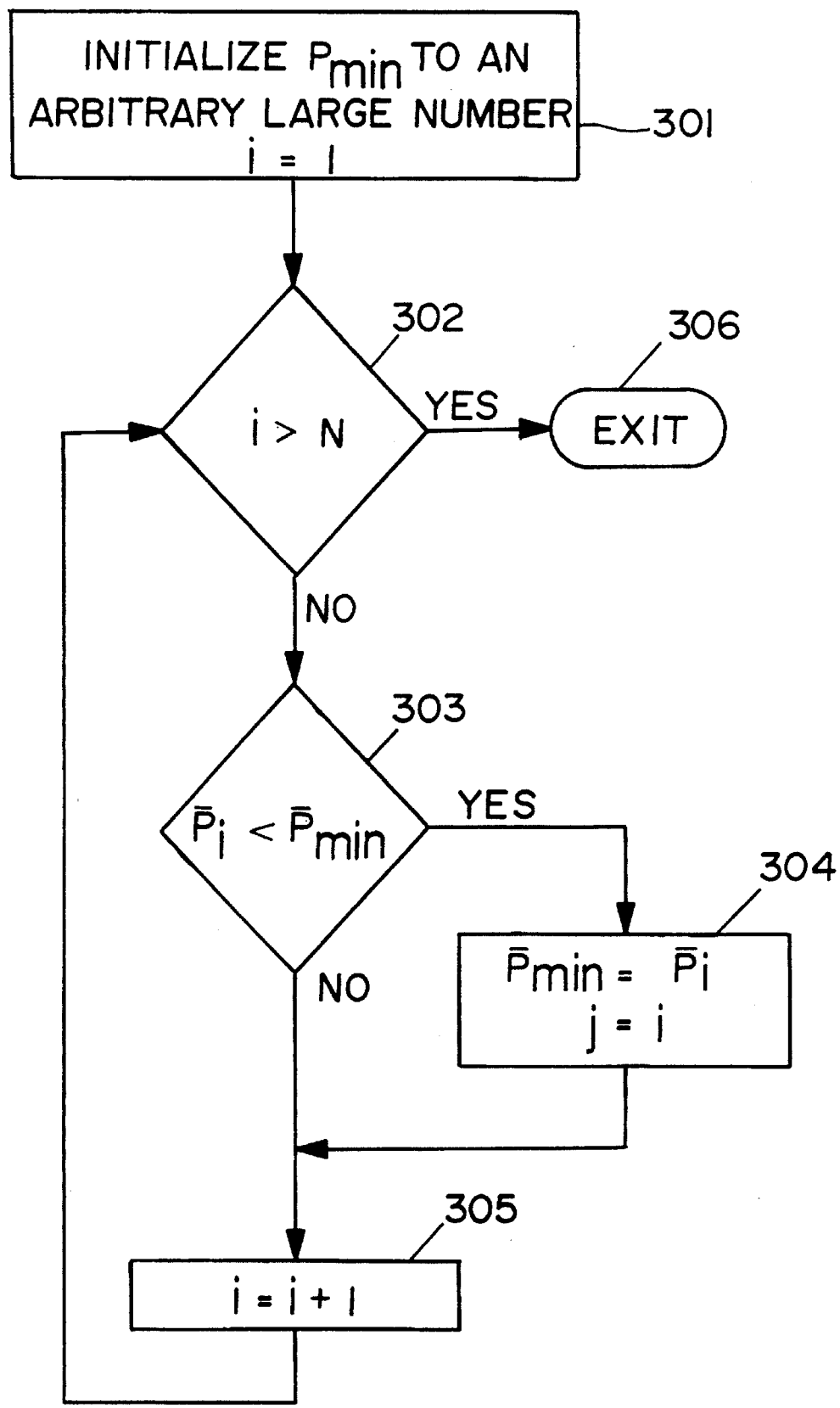
FIG. 3 is a flow chart of a sub-routine for identifying the minimum amplitude component within a spectrum lobe.

FIG. 3 illustrates the search routine for identifying the frequency bin containing the minimum spectral power $\overline{P}_{min}$. At the start 301, $\overline{P}_{min}$ is initialized to a arbitrarily large number and the index i is initialized to i=1. Decision block 302 determines whether the search of the sequence is complete, which is not true at i=1, enabling decision block 303. Decision block 303 compares the current $\overline{P}_i$ with $\overline{P}_{min}$ and replaces, at 304, $\overline{P}_{min}$ with the current $\overline{P}_i$ if $\overline{P}_i <$ $\overline{P}_{min}$. Else, block 303 enables block 305 to increment i to the next index, and the program loops to block 302 to repeat the comparison for the next index. After i=N, all frequency bins have been searched and the routine is exited at 306. The index of the frequency bin containing minimum power will appear in box 304.

After the index of the frequency bin containing minimum power is determined, the entire spectrum is shifted to the left so that the minimum power frequency bin appears first in the PSD sequence while all other components maintain their original relative frequency order.

Spectrum shifting, box 29, is illustrated in FIGS. 2B and 2C. In FIG. 2B, the frequency bin 31 containing minimum power is located at frequency index i=5. In FIG. 2C, the entire PSD 26 has been shifted to the left so that original frequency index i=5 is now positioned at index j=1. Circular indexing is again employed, so that at the upper frequency boundary of the shifted spectrum, the power at index j=N is the same as the power at i=4 in the original PSD sequence of FIG. 2B. Shifting the PSD so that the sequence begins at the frequency index of the minimum power component insures that no lobe of the PSD envelope 26 will straddle a frequency boundary of the PSD.

The shifted PSD sequence $\overline{P}_j, \overline{P}_{j+1}, \ldots \overline{P}_{j-1}$ is then subjected to a series of operations, indicated collectively at 35, the purpose of which is to remove, by means of Spectral Gaussian Envelope Discrimination (SGED), spectral content due to clutter.

SGED involves scanning the PSD envelope to locate a lobe thereof containing an amplitude peak; fitting a curve to such lobe to determine its pseudo-Gaussian parameters; and, removing the lobe from the PSD, if the pseudo-Gaussian parameters thereof indicate that the lobe content is due to clutter.

The spectral envelope 26 of FIG. 2C contains a lobe 32, probably due to clutter, and a lobe 33, possibly due to moving discrete targets, both of which are to be removed if they prove to have pseudo-Gaussian characteristics less than a specified threshold. A pseudo-Gaussian parameter, sigma, is principally relied upon to distinguish lobe content due to clutter or moving discrete targets from content due to weather and windshear. The pseudo-Gaussian sigma is analogous to the Gaussian sigma, which is the commonly used symbol for the standard deviation of a Gaussian function. A modified form of the Gaussian sigma, $\sigma^*$, is used herein for comparison with the pseudo-Gaussian $\sigma$ derived from the PSD lobe. Whenever $\sigma$ is less than $\sigma^*$, the lobe content is considered to be clutter related.

Figure 4A:
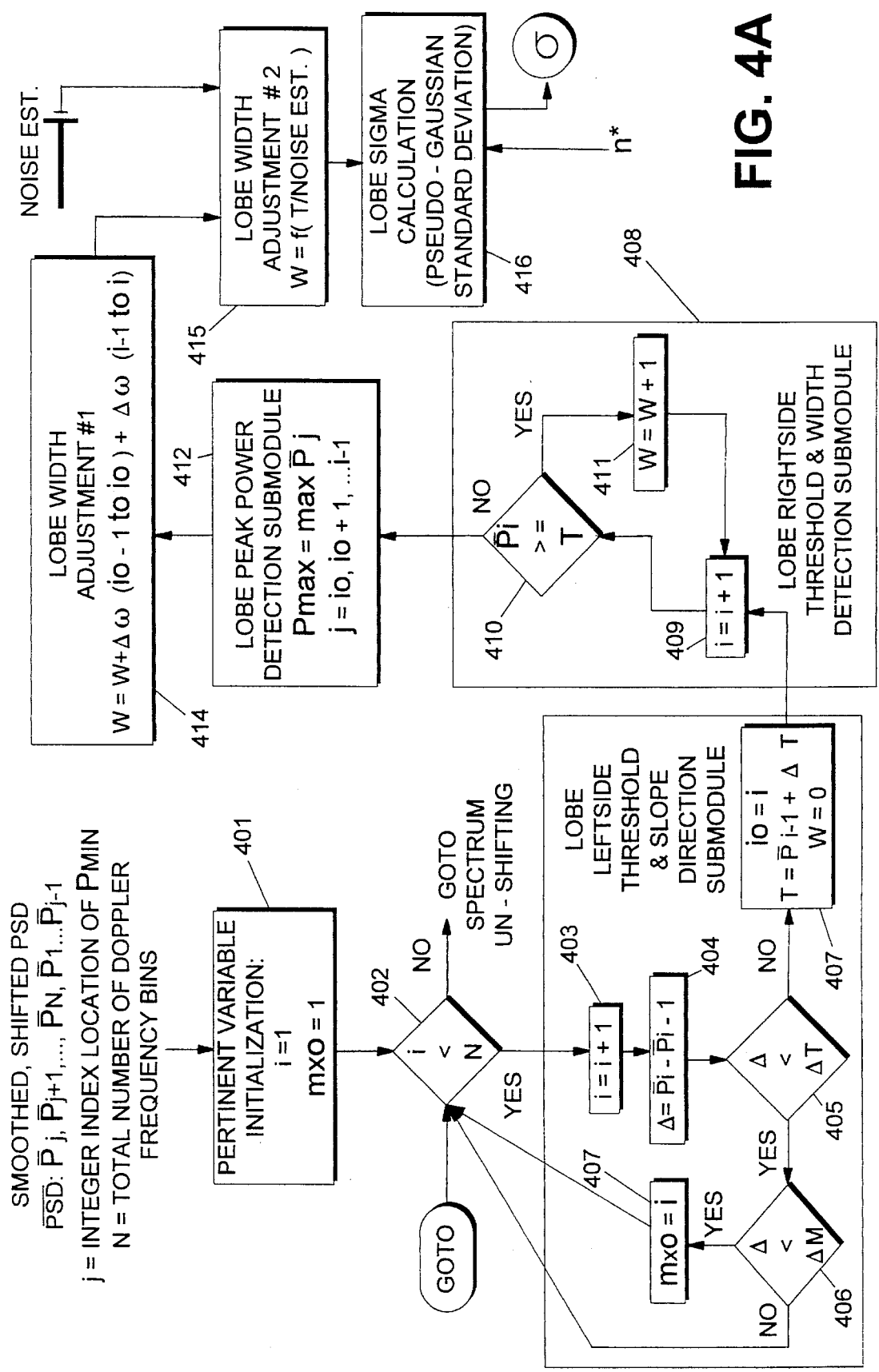
FIGS. 4A and 4B, together, form a flow chart of the SGED method of the invention.
Figure 4B:
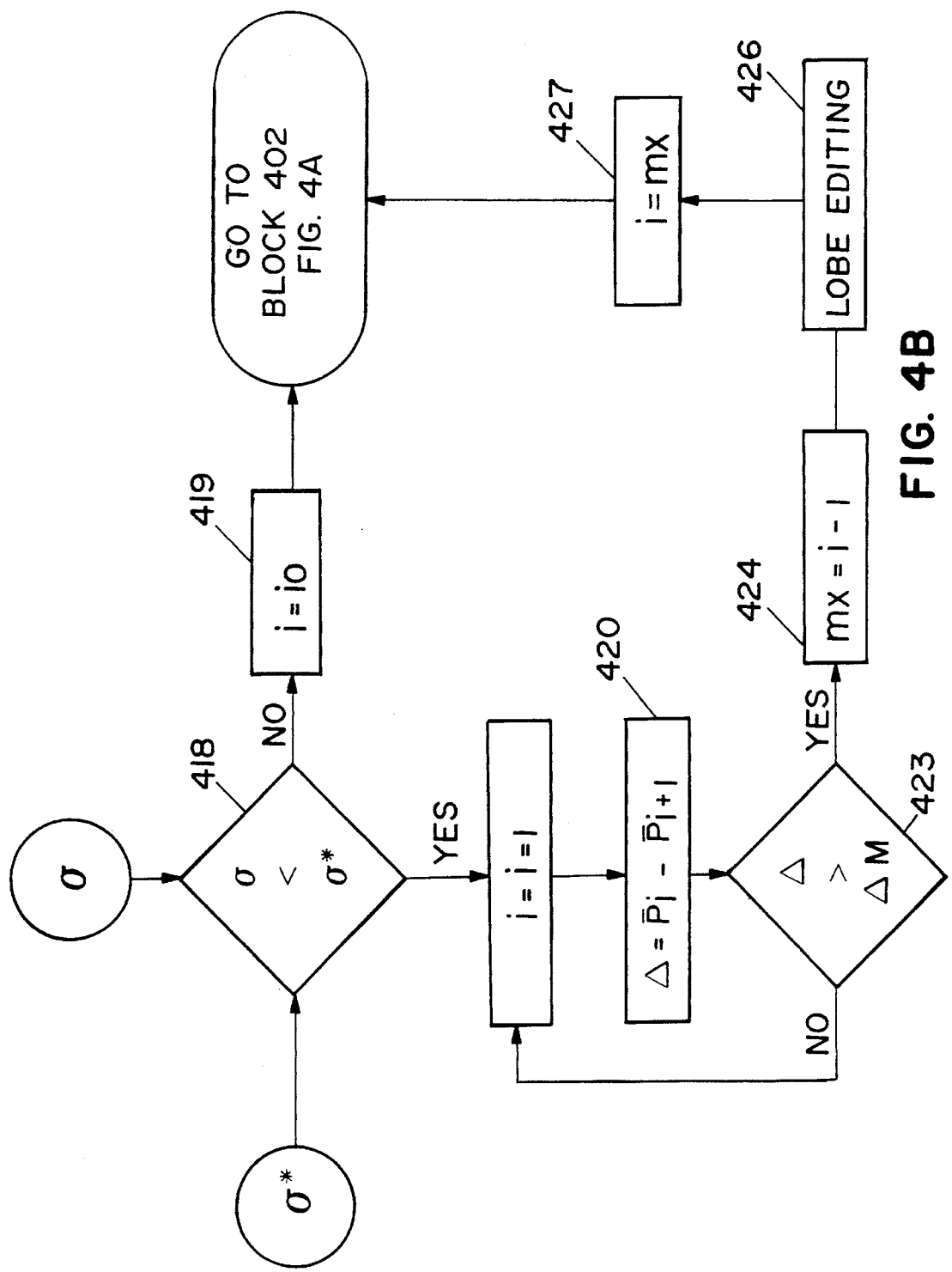
Figure 5:
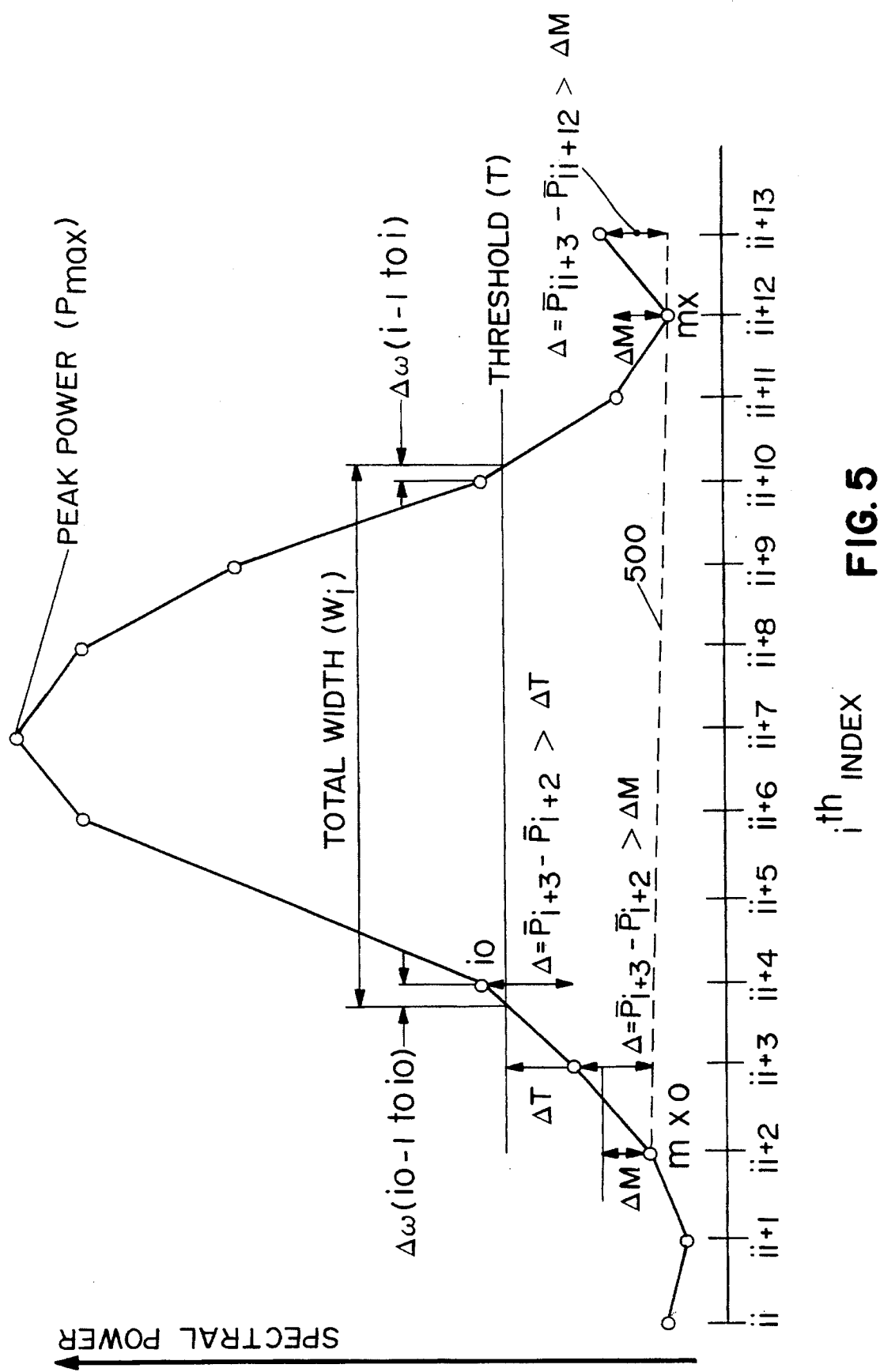
FIG. 5 is a plot of a spectral lobe illustrating the operation of the invention.

FIGS. 4A and 4B, together, are a flow chart of the method of clutter rejection via SGED and FIG. 5 illustrates the principles of the method of identifying a lobe of the PSD. Referring to FIG. 4A, the lobe search routine is initialized at step 401 by setting i=1 and mxo=1. The index of the point at which the left side of a lobe begins to rise is assumed to be mxo. Initially, i is less than N, decision box 402 increments i (403), then in step 404, the difference $\Delta$ is found between the power at the current index $P_i$ and the power at the immediately preceding index $P_{i-1}$. Decision block 405 determines whether $\Delta$ is less that a fixed value $\Delta T$. $\Delta T$ is normally selected to be 3 dB. Such a slope is indicative of the rising left side of a significant spectral lobe. If $\Delta$ is less than $\Delta T$, decision block 405 enables decision block 406 to determine whether $\Delta$ is less than a fixed value $\Delta M$, normally 1 or 2 dB. If $\Delta$ is less than $\Delta M$, decision block 506 sets mxo to the current index i (box 407) and returns to block 402 from which the loop is repeated until a value of $\Delta$ is found that is greater than $\Delta T$. At that point, decision block 405 enables step 407 which: (1) sets a threshold T at the sum of $\Delta T$ and the lesser power used in the calculation of $\Delta$; (2) sets $i_o$ equal to the index of the greater power used in the $\Delta$ calculation; and (3) sets the width W of the lobe equal to zero.

The operation of steps 401–407 in locating the left side of a PSD lobe is shown in FIG. 5, to which reference is now made. Until the index ii+2 is reached by stepping through the loop 402–407, $\Delta$ has been less than $\Delta T$ and $\Delta M$. At ii+3, $\Delta = P_{ii+3} - P_{ii+2} > \Delta M$, thus block 406 does not change the position of mxo from index ii+2. At index ii+4, $\Delta = P_{ii+4} - P_{ii+3} > \Delta T$. Decision block 405 enables step 407 to set $T = P_{ii+3} + \Delta T$; to set io to the current index, ii+4; and to set W=0.

Referring to FIG. 4A, after establishing the location of io, the routine moves to loop 408 where the index of io is incremented (409) and the power at the incremented index is compared with T. If the power at such index is greater than or equal to T, decision block 410 increments W (411) and repeats the loop. Loop 408 is executed until the power at the current index becomes less than T. Then the current index is identified as the index i of the lobe right side threshold point and decision block 410 enables step 412 to search for the index having the greatest power within the portion of the spectrum bounded by indices $i_o$ and i. Step 412 comprises a routine similar to that shown in FIG. 3 except that the search is conducted for the maximum power component rather than the minimum power component.

After completion of step 412, or in parallel therewith, adjustment #1 (414) is made to the lobe width W. This adjustment improves the accuracy of the lobe width by including within the lobe the fractional portions $\Delta\omega_{(io-1)-io}$ at the left side, and $\Delta\omega_{(i-1)-i}$ at the right side. The adjustment is made by interpolation according to the following:

$$\Delta\omega_{(io\,1)\,io} = \frac{\overline{P}_{io} - T}{\overline{P}_{io} - \overline{P}_{io-1}} \quad (4)$$

$$\Delta\omega_{(i\,1)\,i} = \frac{\overline{P}_{i-1} - T}{\overline{P}_{i-1} - \overline{P}_i}$$

Next, lobe width Adjustment #2 (415) is completed. This adjustment improves the accuracy of the lobe width W by accounting for the distortion resulting from the spreading of the lobe at the threshold T due to the proximity of the threshold to the noise power per frequency bin (Noise Est.). Adjustment #2 is made by scaling W as a function of the power ratio of T-to-Noise Est. according to the following:

$W_2 = K \times W_1$;

where:

$W_2$ is the lobe width after Adjustment #2, and $W_1$ is the lobe width after Adjustment #1 K is as determined below:

$$\rho = 10.0 \times \log_{10}\left(\frac{T}{\text{NoiseEst.}}\right) \quad (5)$$

$$K = \begin{pmatrix} \text{unreliable} \Rightarrow 1 & \rho \leq 0.0 \\ 0.005269\rho + 0.9315 & 0.0 < \rho < 13.0 \\ 1 & \rho \geq 13.0 \end{pmatrix}$$

The effects of Adjustment #1 are seen in FIG. 5 where the portions $\Delta\omega_{(io-1-io)}$ and $\Delta\omega_{(i-1-i)}$ are added to the left and right sides of the width W extending between the points i0 and i.

The width W, after Adjustment #2 is made, is used in the calculation of the lobe $\sigma$ (416) according to the following:

$$\sigma = \frac{W}{2} \times \left[\ln\left(\frac{P_{max}}{T}\right)^2\right]^{\frac{-1}{n^*}} \quad (6)$$

In equation (6), $n^*$ has the value calculated in subroutine 37, FIG. 1. Subroutine 37 also provides a value for the pseudo-Gaussian standard deviation $\sigma^*$ that is related to the operating conditions under which the sample set for the PSD was obtained.

Figure 6:
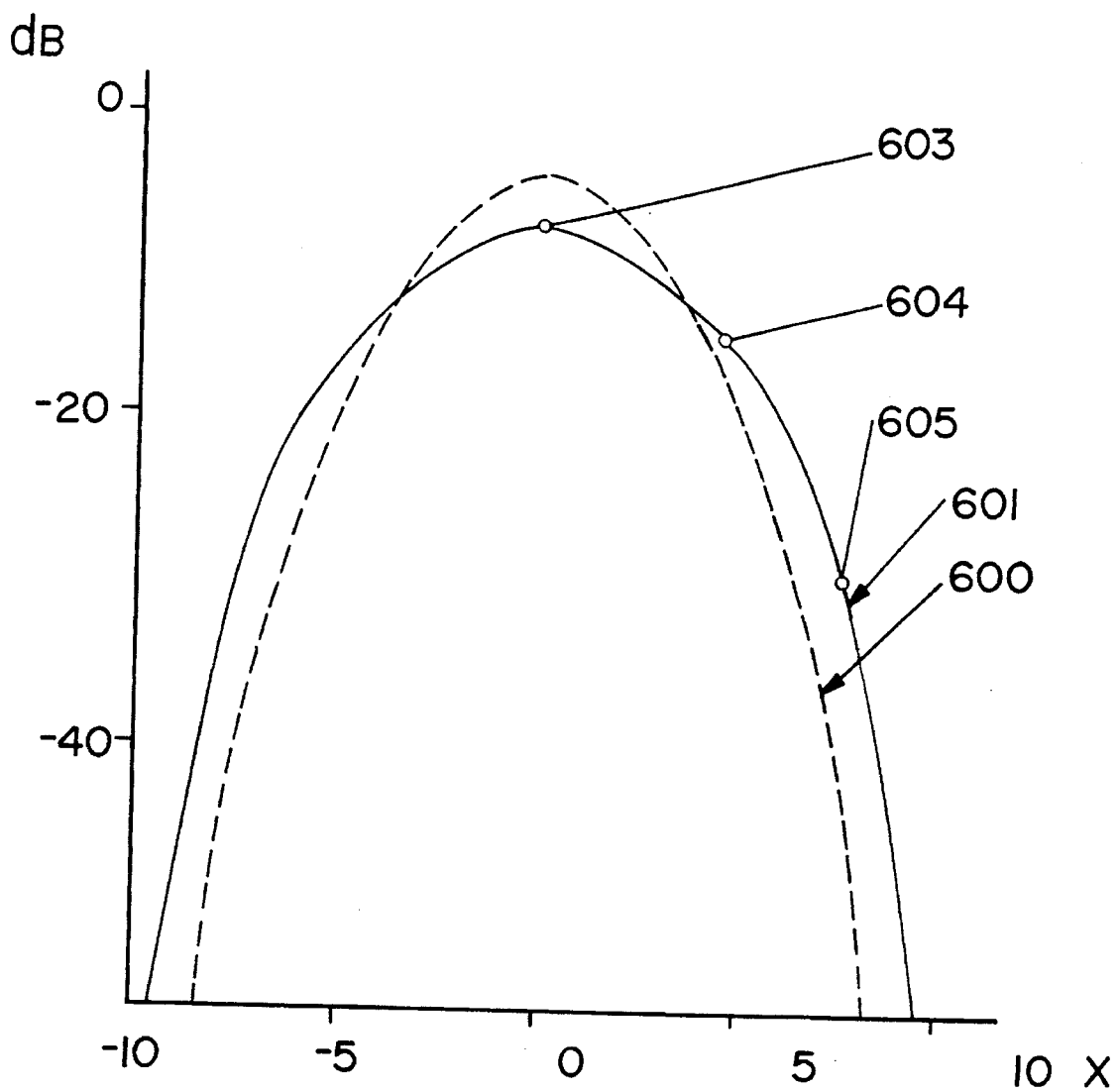
FIG. 6 contains a plot of a function having Gaussian characteristics and a plot of the same function after filtering by a sliding window, from which pseudo-Gaussian parameters are computed.

Referring to FIG. 6, the dashed line curve 600 is a plot of equation (7), below, in which n=2 and $\sigma$ is the true Gaussian Doppler frequency standard deviation for stationary clutter $\sigma_o$ adjusted to account for the velocity v of the radar, the two-way antenna beam width $\theta_{b2}$, and the Doppler angle of the radar relative to stationary clutter.

$$10 \times \log_{10}(\epsilon^{-\frac{1}{2} \cdot (\frac{x_i}{\sigma})^n}) \quad (7)$$

$$n = 2$$

where:

$\sigma^2 = \sigma_o^2 + \sigma_{bb}^2$;

$\sigma_{bb} = k \cdot v \cdot \theta_{b2} \cdot \sin(\theta_d)$ $\sigma_o$=standard deviation for stationary clutter (Hz)

$\sigma_{bb}$=increase in $\sigma_o$ due to radar motion k=scaling coefficient (meters$^{-1}$)

v=radar velocity (meters/sec.)

$\theta_{b2}$=antenna two-way beam width (radians)

$\theta_d$=Doppler angle of radar beam (radians)

The frequency smoothing filter 25 (FIG. 1) broadens the lobes of the PSD so that any lobes that could be characterized as having a Gaussian distribution prior to filtering can only be characterized as having pseudo-Gaussian distribution after filtering.

A clutter spectral lobe having pseudo-Gaussian distribution is defined by the following:

$$P = 10 \times \log_{10}(\epsilon^{-\frac{1}{2} \cdot (\frac{|x_i|}{\sigma^*})^{n^*}}) \quad (8)$$

Note that in equation (8) the values of $n^*$ and $\sigma^*$ differ from the values of n and $\sigma$ in equation (7). In order to determine the values for $n^*$ and $\sigma^*$ that reflect the effects of filter 25 on the PSD, the distribution of the clutter spectrum is recalculated using equation (9), below, producing curve 601 (FIG. 6).

$$y = 10 \times \log_{10}\left(\frac{1}{X} \times \sum_{i-\frac{X-1}{2}}^{i+\frac{X-1}{2}} \epsilon^{-\frac{1}{2} \cdot (\frac{x_i}{\sigma})^n}\right) \quad (9)$$

$$n = 2$$

Note that in equation (9), n=2, $\sigma$ has the same value as in equation (7), and X=5, as in filter 25 (FIG. 1). In order to fit equation (8) to curve 601, equation (9) is used to calculate the value of y for three values of $x_i = x_1$, $x_2$, and $x_3$; where: $x_1=0$, $x_2=(X+1)/2=3$, and $x_3=X+1=6$. Then:

$$n^* = \log\left(\frac{\log\left(\frac{y_2}{y_1}\right)}{\log\left(\frac{y_3}{y_1}\right)}\right) \div \log\left(\frac{x_2}{x_3}\right) \quad (10)$$

$$\sigma^* = x_2 \div \left(-2 \cdot \log\left(\frac{y_2}{y_1}\right)\right)^{\frac{1}{n^*}} \quad (11)$$

Referring to FIG. 4B, decision block 418 compares the value of $\sigma$, calculated in step 416 for the lobe under consideration, with the value of $\sigma^*$, the pseudo-Gaussian standard deviation calculated in sub-routine 37 (FIG. 1).

If $\sigma$ is not less than $\sigma^*$, the lobe under consideration is deemed not to be clutter. Therefore, the lobe is not considered to be composed of clutter related components and no change is made in the PSD. In such case, block 418 sets i=io (419) and returns the program to block 402 for multiple passes over the lobe at different threshold levels.

If $\sigma$ is less than $\sigma^*$, the lobe is considered to be composed of clutter related components and block 418 initiates a lobe right side slope detection sub-routine 420. In sub-routine 420 the slope between adjacent indices beyond the right threshold i is searched for a slope $\Delta$ that is greater than $\Delta M$, where $\Delta M$ has the same value as at the left side. Such a slope is indicative of the termination of the current lobe. Where $\Delta$ is greater than $\Delta M$, decision block 423 sets the point mx at the index of the lesser power used in calculation of $\Delta$ (424) and enables lobe editing sub-routine 426. Lobe editing sub-routine 426 replaces the powers $P_m$ at indices between those of mxo and mx with interpolated values according to equation (12) below.

$$P_m = \left[\sqrt{P_{mxo}} + \frac{(m - mxo) \times (\sqrt{P_m} - \sqrt{P_{mxo}})}{(mx - mxo)}\right]^2 \quad (12)$$

Referring to FIG. 5, sub-routine 419 calculates $\Delta$ beginning with the index for point i and continuing to the right, i.e., $\Delta = P_{ii+11} - P_{ii+10}$ etc. Between indices ii+12 and ii+13, $\Delta$ becomes greater than $\Delta M$. Consequently, the point mx is set at the index of the lesser of the powers used in the $\Delta$ calculation, i.e., ii+12. Lobe editing sub-routine 426 replaces the powers at the indices between those of mxo (ii+2) and mx (ii+12) with values indicated by dashed line 500.

Returning to FIG. 4B, after completion of lobe editing 426, i is set to the index of mx (step 427) of the edited lobe and the program is returned to block 402, FIG. 4A, for scanning of the PSD spectrum through indices to the right of that of the point mx to locate additional lobes that may be classified as clutter. Any such additional lobes are edited in the same manner as just described. When the entire PSD spectrum has been scanned and edited, as indicated by i=N at block 402, the spectrum is un-shifted (38, FIG. 1) to return the indices of the spectrum components to their original frequency distribution. After editing and un-shifting the spectrum appears as is seen in FIG. 2B with lobes 32 and 33 replaced by the dashed lines 39 and 40.

The PSD spectrums for the remaining M range bins of the current radial are processed by the SGED method described to eliminate clutter related components and additional M×N sample sets are similarly collected and processed until the desired azimuthal scan angle is covered. The data from the many SGED processed PSD spectra are made available for post processing 42 (FIG. 1) and generation of a windshear alarm 43, if conditions warrant.

The post processing procedure usually involves the following steps:

1) Estimation of the mean Doppler frequency in each range bin via an unbiased spectral mean estimation method such as covariant argument estimation.
2) Estimation of the change in mean Doppler frequency as a function of range using a sliding Least Means Square linear regression process subtending a span of five range bins.
3) Conversion from Doppler frequency change per range bin to velocity change per range bin using the Doppler frequency relationship $\Delta V=\Delta F \cdot \lambda/2$, where $\lambda$ is the radar wavelength.
4) Calculation of the horizontal shear, $\Delta V/\Delta R$, where R is the resolution of one range bin.
5) Calculation of the total hazard factor, $\bar{F}=(\Delta V/\Delta R) \cdot (V_g/g+(2 \cdot z)/V_a)$ as a function of range, where $V_g$ is the aircraft ground speed, $V_a$ is the aircraft airspeed, g is gravitational acceleration, z is the estimated altitude of each range bin ($z=h+R \cdot \sin \theta_t$, where R is the slant range to the rang bin, h is the aircraft altitude, and $\theta_t$ is the antenna tilt angle, measured from local horizon to beam center)
6) Calculation of spatially averaged hazard factor FBAR equal to the average of hazard factor estimates F over a span of one kilometer.
7) Comparison of the FBAR estimates against a hazard threshold.
8) Retention of the FBAR estimates exceeding the hazard threshold.
9) Estimation of the area in which hazard threshold is exceeded by estimating the down range by cross range hazard extent; cross range extent is estimated and correlated over multiple sets of cross range samples.
10) Thresholding of hazard areas based upon minimum area criteria.
11) Declaration of the threshold hazard areas as "objects" for aircrew presentation.
12) Transformation of the "objects" into "icons" for aircrew presentation.
13) Classification of the aircrew alert levels depending upon the estimated range to the "icon" and angular displacement from the projected aircraft flight path.
14) Issuance of the visual and aural aircrew alerts appropriate for the classified alert levels.

Modifications and variations in the method of the invention are possible in the light of the above teachings. It is therefore to be understood that the invention may be practiced otherwise than as specifically disclosed without departing from the spirit and scope of the following claims.

The invention claimed is:

1. A method for eliminating clutter related frequency components from a power spectrum, comprising:

scanning the envelope of said spectrum to identify a lobe thereof;

determining the width of said lobe;

determining the maximum amplitude within said lobe;

calculating from said determined width and amplitute a first pseudo-Gaussian parameter relating to said lobe;

comparing said first pseudo-Gaussian parameter with a second pseudo-Gaussian parameter, said second pseudo-Gaussian parameter being similar in kind to said first pseudo-Gaussian parameter and being calculated for known conditions; and deleting said lobe from said spectrum envelope whenever said first pseudo-Gaussian parameter is less than said second pseudo-Gaussian parameter.

2. The method as claimed in claim 1, wherein said power spectrum comprises a sequence $P_j$, P being the magnitude and j being the index 1,2, ... N of frequency components of said spectrum, including:

determining the frequency component of said spectrum having the minimum power magnitude; and shifting the order of the frequency components of said spectrum so that said frequency component having the minimum magnitude is first in order of said sequence, said shifting being performed prior to said scanning.

3. The method as claimed in claim 2, further including:

filtering said power spectrum prior to performing said step of shifting the order of the frequency components.

4. The method as claimed in claim 3 wherein said first pseudo-Gaussian parameter is similar to a Gaussian standard deviation sigma; and wherein said second pseudo-Gaussian parameter is calculated as the sigma of a function having Gaussian distribution, which function has been filtered prior to calculation of said second pseudo-Gaussian parameter.

5. The method as claimed in claim 4, wherein:

similar filter means are used for filtering said power spectrum and for filtering said function having Gaussian distribution.

6. The method of processing weather radar return signals to provide enhanced capability of detecting windshear phenomena, comprising:

synchronously detecting said radar return signals to provide complex i and q time domain sample sequences;

converting, by meant of a Fast Fourier Transform, said complex time domain sequences into complex i and q frequency domain sample sequences;

calculating a power spectrum from said i and q frequency domain sample sequences;

subjecting said power spectrum to a spectral Gaussian envelope discrimination (SGED) process to eliminate clutter related frequency components from said spectrum; and utilizing said SGED processed spectrum to determine windshear hazard, wherein said Spectral Gaussian Envelope Discrimination process includes the steps of:

scanning the envelope of said power spectrum to determine the presence of a lobe of said envelope having a maximum amplitude greater than a predetermined threshold;

establishing the width of said lobe;

calculating from said maximum amplitude and said width of said lobe a first pseudo-Gaussian parameter that is characteristic of the distribution of said lobe;

comparing said first pseudo-Gaussian parameter with a second pseudo-Gaussian parameter of like kind, said second pseudo-Gaussian parameter being characteristic of the distribution of a known curve; and deleting said lobe from said envelope of said power spectrum whenever said comparison indicates that said lobe is pseudo-Gaussain in character.

7. The method as claimed in claim 6, further including:

applying digital filtering means to said power spectrum prior to subjecting said power spectrum to said spectral Gaussian envelope discrimination process.

8. The method as claimed in claim 7, wherein said power spectrum comprises a sequence $P_j$, P being the power magnitude and j being the index, 1,2, ... N, of frequency components of said sequence, and said filter means is of the form:

$$PSD = \frac{1}{X} \times \sum_{j=i-\frac{X-1}{2}}^{i+\frac{X-1}{2}} P_j$$

where X is a predetermined constant.

9. The method as claimed in claim 8, including the steps of:

identifying the component $P_{min}$ of said filtered power spectrum having the minimum magnitude; and shifting the positions of said components $P_j$ of said filtered spectrum so that said minimum magnitude component $P_{min}$ is first in the sequence of components of said filtered power spectrum, said shifting being performed prior to subjecting said spectrum to said SGED process.

10. The method as claimed in claim 9, including, after deleting said lobe from said envelope of said power spectrum and prior to utilizing said SGED processed spectrum to determine windshear hazard:

restoring the positions of said components in said spectrum sequence to the order occupied by said components $P_j$ prior to said step of shifting the positions of said components.

11. The method of processing weather radar return signals to provide enhanced capability of detecting windshear phenomena, comprising:

synchronously detecting the radar return signals from a first transmitted pulse to provide first set of complex i and q analog time domain signals;

converting said first set of i and q analog signals into a first sequence of i and q digital time domain signals;

storing said i and q digital signals according to their time of reception in M separate range bins;

repeating said steps of synchronously detecting, converting, and storing for N consecutive transmitted pulses, the i and q digital signals from said N transmitted pulses, said i and q digital signals being stored in an M×N buffer;

forming a first complex sequence $i_1, i_2, \ldots i_N$ and $q_1, q_2, \ldots q_N$ from said i and q digital signals stored in said range bins for a particular range;

passing said first complex sequence through a time domain window to reduce the amplitudes of said i and q signals near the ends of said first sequence;

transforming by means of a Fast Fourier Transform said first complex sequence from the time domain to the frequency domain to provide a second complex sequence $I_1, I_2 \ldots I_N$ and $Q_1, Q_2 \ldots Q_N$;

calculating a power spectrum $P_1, P_2, \ldots P_N$ from said second complex sequence;

passing said power spectrum through a frequency smoothing filter;

scanning the envelope of said filtered spectrum to define a lobe thereof having a rising edge with slope greater than a predetermined threshold slope;

determining the width and maximum amplitude of said lobe;

computing from said lobe width and maximum amplitude a first pseudo-Gaussian sigma;

comparing said first pseudo-Gaussian sigma with a second pseudo-Gaussian sigma, said second sigma being obtained from known conditions; and editing out said lobe from the envelope of said filtered spectrum whenever said first sigma is less than said second sigma.

12. The method as claimed in claim 11 wherein said second sigma is obtained from a Gaussian function that has been passed through a frequency smoothing filter.

13. The method as claimed in claim 11 wherein said spectrum comprises a sequence of power magnitude components positioned at successive frequency indices and said envelope comprises a line connecting the end points of said power magnitude components, and wherein said step of determining the width of said lobe includes:

identifying the index of a first component of said spectrum at which point the slope of said envelope becomes greater than said threshold slope; and identifying the index of a second component of said spectrum at which point the magnitude of said envelope becomes less than a predetermined threshold magnitude, the magnitudes and the indices of said first and second components defining the locations of opposite edges of said lobe.

14. The method as claimed in claim 13 wherein said step of determining the width of said lobe includes, after identifying said indices of said first and second components:

adjusting the width of said lobe by interpolating between the magnitude of said first component and said threshold magnitude and between the magnitude of said second component and said threshold magnitude.

15. The method as claimed in claim 14, including:

estimating the noise content of said spectrum; and, after said step of adjusting the width of said lobe by interpolating, further adjusting the width of said lobe as a function of the ratio of said threshold magnitude to said estimated noise.

* * * * *